United States Patent
Schutzer

(10) Patent No.: US 7,168,091 B2
(45) Date of Patent: Jan. 23, 2007

(54) METHOD AND SYSTEM OF TRANSACTION SECURITY

(75) Inventor: Daniel Schutzer, Scarsdale, NY (US)

(73) Assignee: Citibank, N.A., New York, NY (US)

( * ) Notice: Subject to any disclaimer, the term of this patent is extended or adjusted under 35 U.S.C. 154(b) by 175 days.

(21) Appl. No.: 10/800,599

(22) Filed: Mar. 15, 2004

(65) Prior Publication Data

US 2004/0181669 A1     Sep. 16, 2004

Related U.S. Application Data

(60) Provisional application No. 60/454,316, filed on Mar. 14, 2003.

(51) Int. Cl.
*G06F 17/00* (2006.01)

(52) U.S. Cl. .................... 726/7; 726/6; 726/5; 726/18; 726/19; 726/32

(58) Field of Classification Search ............... 726/7, 726/6, 5, 4, 32, 18, 19
See application file for complete search history.

(56) References Cited

U.S. PATENT DOCUMENTS

| | | | | |
|---|---|---|---|---|
| 5,712,913 | A * | 1/1998 | Chaum | 705/74 |
| 5,781,631 | A * | 7/1998 | Chaum | 705/69 |
| 5,799,086 | A * | 8/1998 | Sudia | 705/76 |
| 5,872,849 | A * | 2/1999 | Sudia | 713/175 |
| 6,205,204 | B1 * | 3/2001 | Morganstein et al. | 379/67.1 |
| 6,263,437 | B1 * | 7/2001 | Liao et al. | 713/169 |
| 6,314,518 | B1 * | 11/2001 | Linnartz | 713/176 |
| 6,526,126 | B1 * | 2/2003 | Morganstein et al. | 379/88.02 |
| 6,574,266 | B1 * | 6/2003 | Haartsen | 375/133 |
| 6,760,420 | B2 * | 7/2004 | Heilmann et al. | 379/189 |
| 6,769,060 | B1 * | 7/2004 | Dent et al. | 713/168 |
| 6,804,647 | B1 * | 10/2004 | Heck et al. | 704/246 |
| 6,816,579 | B2 * | 11/2004 | Donovan et al. | 379/88.17 |
| 6,845,092 | B2 * | 1/2005 | Vassilovski et al. | 370/342 |
| 6,851,054 | B2 * | 2/2005 | Wheeler et al. | 713/176 |
| 6,857,072 | B1 * | 2/2005 | Schuster et al. | 713/160 |
| 2002/0178385 | A1 * | 11/2002 | Dent et al. | 713/202 |

OTHER PUBLICATIONS

The Localisation of Traffic Accidents in Urban Areas by Using Satellite Navigation Systems (GPS and Glonass); presentation by Peter Maurer at the KFB Conference on Urban transport systems, Lund, Sweden; Jun. 7-8, 1999, pp. 1-16.

Jeff Wepman; Digital Sampling Channel Probe; originally published n Federal Lab Test & Measurement Tech Briefs supplement to NASA Tech Briefs, May 1995, pp. 1-2.

(Continued)

*Primary Examiner*—Norman M. Wright
(74) *Attorney, Agent, or Firm*—George T. Marcou; Kilpatrick Stockton LLP

(57) ABSTRACT

A method and system for secure authentication of a user in a session conducted over an interactive communication channel, such as a two-way telephony communication channel, with an authenticating entity, such as a financial institution, utilizes a session identifier, such as pseudorandom noise to detect and identify attempts to play back authentication information, such as user-spoken phrases, intercepted and recorded by an unauthorized party during a previous session between the user and the authenticating party.

30 Claims, 3 Drawing Sheets

OTHER PUBLICATIONS

Randy Roberts: The ABCs of Spread Spectrum—A Tutorial; retrieved from the internet at URL http://www.sss-mag.com/ss.html on Mar. 5, 2004, pp. 1-7.

Web page entitled; Spread Spectrum Communication Techniques and Code Divison Multiple Access (CDMA) Methods; retrieved from the internet at URL http://ginevra.dibe.unige.it/ISIP/Research/ss_int.html on Mar. 5, 2004, pp. 1-4.

Web page entitled: Additional Technical Information—Bell Labs DS/PPM Technology; retrieved from the internet at URL http://www.bell-labs.com/news/1997/april/22/2.html on Mar. 5, 2004, p. 1.

Web page entitled; Wireless LANs: retrieved from the internet at URL http://murray.newcastle.edu.au/users/staff/eemf/ELEC351/SProjects/Don/nowlan.htm on Mar. 5, 2004, pp. 1-4.

Spread Spectrum Wireless Technology; paper by Wi-LAN inc, published Sep. 2000, pp. 1-3.

Web page entitled: Pseudorandom Noise; retrieved from internet at URL http://en.wikipedia.org/wiki/Pseudorandom_noise, update of Mar. 3, 2004, 1 pp.

Web page entitled: PRF and KDF algorithms: retrieved from the internet at URL http://www.users.zetnet.co.uk/hopwood/crypto/scan/prf.html on Mar. 5, 2004.

Web page entitled: Service & Support—Modulate; retrieved from the internet at URL http://www.hayes.com/support/modulate.html on Mar. 5, 2004, 1 pg.

Web page entitled: modulate; retrieved from the internet at URL http://www.webopedia.com/TERM/M/modulate.html on Mar. 5, 2004, pp. 1-2.

Web page entitled: modulation; retrieved from the internet at URL http://searchnetworking.techtarget.com/sDefinitions/0,,sid7_gci212586,00.html on Mar. 5, 2004, pp. 1-3.

Brooke Clarke: Cryptographic Patents; retrieved from internet at URL http://www.pacificsites.com/~brooke/Cryptopat.shtml on Mar. 3, 2004, pp. 1-4.

Michael Haag: Introduction to Random Signals and Processes; retrieved from the internet at URL http://cnx.rice.edu/content/m10649/latest/ on Mar. 5, 2004, p. 1-4.

Ankoor Nalk: Frequency Hopping Spread Spectrum; presentation at Rutgers University, Spring 2003; available at URL http://www.winlab.rutgers.edu/~aanaik/FHSS.doc, p. 1-11.

* cited by examiner

METHOD AND SYSTEM OF TRANSACTION SECURITY

PRIORITY APPLICATION

This application claims the benefit of U.S. Provisional Application No. 60/454,316 filed Mar. 14, 2003, entitled "TRANSACTION SECURITY" and incorporated herein by this reference

FIELD OF THE INVENTION

The present invention relates generally to the field of transaction security, and more particularly to a method and system for secure authentication of a user in a transaction conducted electronically via sound, such as voice.

BACKGROUND OF THE INVENTION

In order to provide security to transactions conducted via voice, e.g., over the telephone, it is often desirable to authenticate the speaker. One existing method for authenticating speakers in a telephone transaction is through a personal identification number (PIN) or telephone PIN (TPIN). While generally referred to as "PIN," the identification can be other than a number, e.g., a voiced phrase, an encoded data stream. Where this application refers to. "voiced PIN," "keyed PIN," "PIN," "authentication information," etc., the full range of identification means are implied.

For example, a telephone banking user provides the PIN via voice or telephone keypad in order to inquire as to her account balance. Such an approach to authentication is subject to being compromised, for example, by a third party recording the voiced PIN or decoding the keyed PIN. The recorded or decoded information can then be used for unauthorized access to the account.

One potential solution involves voiceprint authentication, e.g., matching characteristics of a user's voice over the communications channel. Some embodiments of this approach use a training phrase, e.g., "open sesame." A user repeats the training phrase until sufficient characteristics of the user's voice saying the training phrase have been collected. When executing a transaction, the user speaks the training phrase (also referred to as a "pass phrase"); if the characteristics of the spoken training phrase matches the stored characteristics within an acceptable level of confidence, the user is authenticated. This approach is still open to exploitation by recording.

A variation on this approach relies on characteristics of the user's voice that are not specific to training phrases. This variation typically requires a much larger training set; the time required to obtain that training set may serve as a disincentive to enrollment. In addition, the processing resources required are likely much greater for this variation. Further, since the potential for false negatives and false positives is generally greater when the training is not based on a known set of pass phrases, this approach has a major disadvantage with respect to user acceptance.

Approaches have been developed to mitigate the risk of exploitation by record/playback of a speaker's authentication utterances. One such approach involves identifying telltale characteristics and limitations of a playback device (e.g. the absence or presence of special harmonics, modulations or other special signal characteristics) present in the play back of the illicitly recorded utterance (voice, PIN or otherwise). This approach would be effective only where the telltale characteristics were present within the bandwidth of the communication channel.

Another approach involves identifying the natural variation between separate instances of a spoken phrase. If such variations are not present, the risk that the utterance or TPIN is a recording is increased. Substantial variation would not be present between a high-fidelity recording and its spoken original, or between separate high fidelity playbacks of the same recording. Nevertheless, this approach can be defeated, albeit requiring some technical sophistication, by introducing artificial variations—or in a lower-tech fashion by illicitly recording multiple versions of the spoken phrase.

Training on several different user phrases could be used to introduce diversity to the authentication phrase used in any specific transaction. Randomly alternating the required authentication response among the different phrases could be used. This diversity could mitigate the risk of false authentication but, as with other approaches, is susceptible to a reasonably persistent adversary who records multiple user authentication sessions. In addition, diversity among authentication phrases requires more training time, hence potentially less user acceptance.

SUMMARY OF THE INVENTION

It is a feature and advantage of the present invention to provide a method and system for secure authentication of a user in a session conducted over an interactive communication channel, such as a two-way telephony communication channel, with an authenticating entity, such as a financial institution.

It is another feature and advantage of the present invention to provide a method and system for secure authentication of the user in a session conducted over an interactive communication channel that utilizes pseudorandom noise as a session identifier.

It is a further feature and advantage of the present invention to provide a method and system for secure authentication of the user in a session conducted over an interactive communication channel utilizing pseudorandom noise as a session identifier that enables the authenticating entity to determine whether or not authentication information for the user is a playback of a recording of an earlier session.

It is an additional feature and advantage of the present invention to provide a method and system for secure authentication of the user in a session conducted over an interactive communication channel utilizing pseudorandom noise as a session identifier that enables an the authenticating entity, to determine whether or not authentication information for the user is a playback of a recording of an earlier session.

To achieve the stated and other features, advantages and objects, the present invention provides a method and system for secure authentication of a user in a session conducted over an interactive communication channel, such as a two-way telephony communication channel. An embodiment of the invention makes use of computer hardware and software and proposes that a user, such as a voice or touch tone keypad user, is allowed to access an authenticating entity, such as a financial institution, for example, via the two-way telephony communication channel.

Embodiments of the invention utilize for example, a two-way land line telephony communication channel, a two-way wireless telephony communication channel, or a two-way voice over Internet protocol (VoIP) telephony communication channel. Other embodiments of the invention utilize, for example, a two-way hard-wired telephony communication channel, a two-way satellite telephony communication channel, or a two-way microwave telephony communication channel.

When the user accesses the authenticating entity, the authenticating entity inserts a session identifier that is infeasible to detect or eliminate without knowledge of a secret known to the authenticating entity into the two-way telephony communication channel. In an embodiment of the invention, the session identifier is pseudorandom noise deterministically generated according to the secret known only to the authenticating entity, which secret consists, for example, of a pre-determined seed in combination with a pre-selected algorithm for generating the pseudorandom noise. In another embodiment, the session identifier is modulated by pseudorandom noise.

In an aspect of the invention, the session identifier can be inserted into the two-way telephony communication channel by the authenticating entity during an initial personal identification number (PIN) training session for the user. In a further aspect of the invention, a different session identifier can be inserted into the two-way telephony communication channel by the authenticating entity during each subsequent session in which a PIN is entered for the user.

Authentication information for the user, such as the user's voice and/or PIN, can be entered by the user speaking and/or entering the authentication information on a touch tone keypad. Upon receiving the authentication information, the authentication information is analyzed by the authenticating entity to determine whether the session identifier inserted by the authenticating authority into the two-way telephony communication channel is associated with the received authentication information. If so, the authenticating entity can be certain that the authentication information is not a playback of a recording of an earlier session, and the user is authenticated by the authenticating entity based on the authentication information.

In the pseudorandom noise aspect of the invention in which the session identifier is pseudorandom noise, the authentication information is analyzed by the authenticating entity to determine whether the pseudorandom noise associated with the received authentication information is the same as the pseudorandom noise currently inserted by the authenticating authority into the two-way telephony communication channel. In this aspect, the pseudorandom noise associated with the authentication information is analyzed using the secret known to the authenticating entity that consists of the pre-determined seed in combination with the pre-selected algorithm used in generating the pseudorandom noise. If, for example, the analysis identifies pseudorandom noise inserted as a session identifier on a preceding occasion, the authenticating entity can be certain that the authentication information is a recording of the authentication information received on a preceding occasion.

Additional objects, advantages and novel features of the invention will be set forth in part in the description which follows, and in part will become more apparent to those skilled in the art upon examination of the following, or may be learned from practice of the invention.

DETAILED DESCRIPTION

Referring now in detail to an embodiment of the present invention, an example of which is illustrated in the accompanying drawings, the present invention utilizes computer hardware and software to provide a method and system for secure authentication of a user in a session with an authenticating authority conducted electronically over an interactive communication channel, such as a two-way telephony communication channel, partly or entirely via voice.

In a preferred embodiment, a session identifier is inserted into the communication channel by the authenticating entity that cannot be easily detected or eliminated without knowledge of its construction (e.g. pseudorandom noise generated by a secret key known only to the authenticating entity). In some embodiments, the session identifier is inserted during training and during each use of the voiced utterance or keyed PIN. Further embodiments inject pseudorandom noise into the communication channel.

Other embodiments inject a session identifier modulated by pseudorandom noise. Since the system of the authenticating entity knows the key to the pseudorandom stream, the system can recover the stream and data modulated thereon. In additional embodiments, the noise is not readily detectable to the voice user. Preferred embodiments are able to detect a subsequent illicit user playing back a recorded PIN by identifying a non-conforming identifier (e.g. a past, altered, unknown or missing session identifier).

Figure 1:
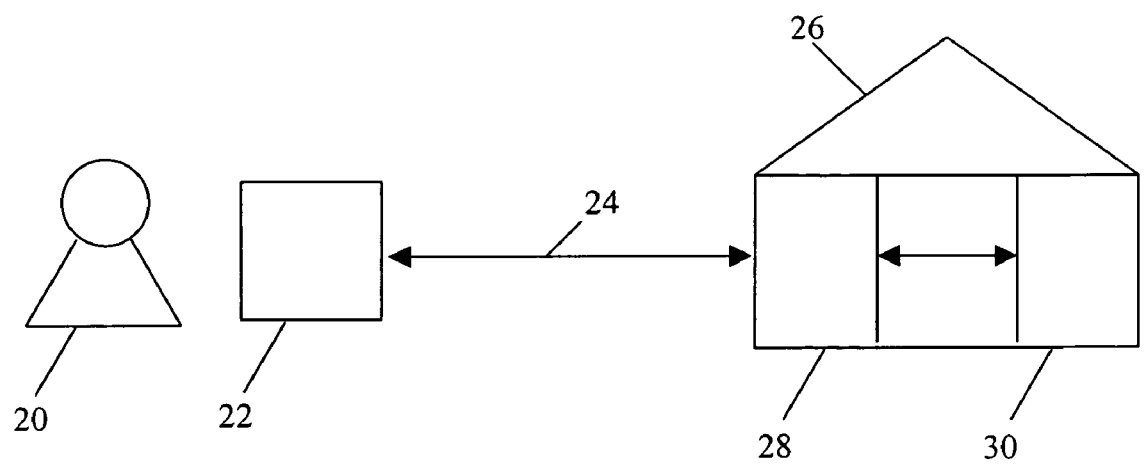
FIG. 1 is a schematic diagram that illustrates an example overview of key components and the flow of information between key components of the system for an embodiment of the present invention.

FIG. 1 is a schematic diagram that illustrates examples of key components and the flow of information between the key components for an embodiment of the invention. Referring to FIG. 1, an embodiment of the invention involves a user 20, such as a voice user, at some type of communication device 22, such as a telephone, a wireless phone, or voice over IP, in which sounds or tones are modulated and converted to electronic analogues of electricity and modulated in whatever form is suitable for the transmission, for example, via satellite, microwave, landline, or the like. The user's communication device 22 is coupled, for example, via a two-way telephony channel of communication 24 to systems of an authenticating entity 26, such as a financial institution, on the receiving end, at which point, the modulated electronic signal is demodulated and converted back by a demodulating device 28, for example, to audio so the sound can be heard. In addition, at the receiving end, a session identifier generator 30, such as a pseudorandom noise generating device injects and also recovers or pulls out the injected signal from the communication channel 24.

Figure 2:
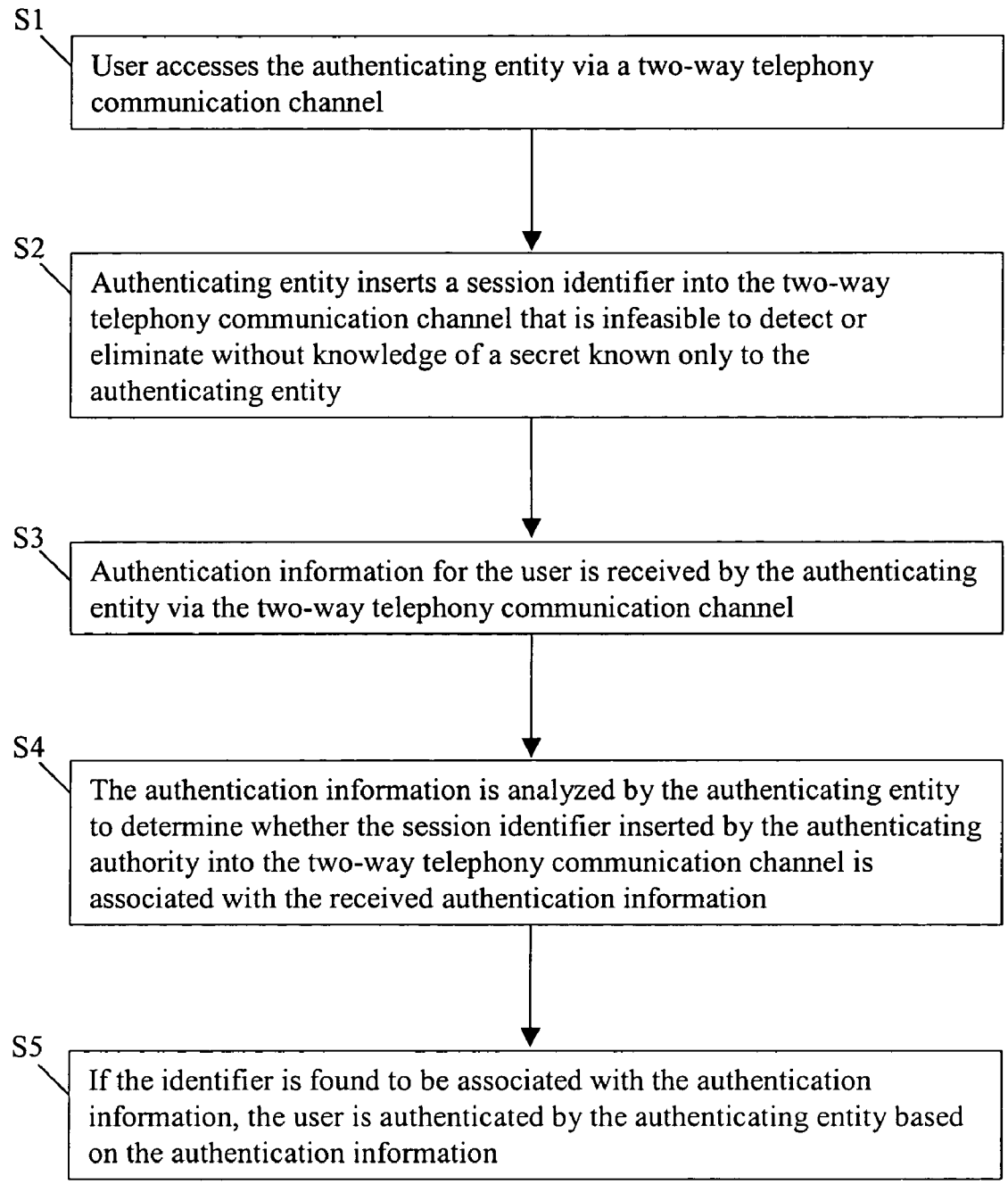
FIG. 2 is a flow chart that illustrates an example of the process of secure authentication of a user in a session conducted over a two-way telephony communication channel according to an embodiment of the present invention.

FIG. 2 is a flow chart that illustrates an example of the process of secure authentication of a user in a session conducted over a two-way telephony communication channel according to an embodiment of the present invention. Referring to FIG. 2, at S1, the user 20 accesses the authenticating entity 26 via a two-way telephony communication channel 24, and at S2, a system of the authenticating entity inserts a session identifier into the two-way telephony communication channel 24 that is infeasible to detect or eliminate without knowledge of a secret known only to the authenticating entity. At S3, authentication information for the user 20 is received by the authenticating entity's system via the two-way telephony communication channel 24, and at S4, the authentication information is analyzed by the authenticating entity's system to determine whether the session identifier inserted by the authenticating entity 26 into the two-way telephony communication channel 24 is associated with the received authentication information. At S5, if the session identifier is found to be associated with the authentication information, the user 20 is authenticated by the authenticating entity 26 based on the authentication information.

It is to be understood that the term "telephony" as used herein includes communication of information by means of electrical signals carried by wires or radio waves, in which voice or other sound is translated into electrical signals, transmitted, and then converted back into audio. The term "telephony" as used herein also refers to computer hardware and software that perform functions traditionally performed by telephone equipment.

The process of inserting an identifier, such as pseudorandom noise generated by a secret key known only to the authenticating entity 26, into the communication channel 24 is similar to generating a pseudorandom number. Although pseudorandom noise seems to lack a definite pattern, it consists of a sequence of signals that will usually repeat itself, for example, after a pre-determined period of time or a long series of signals.

In generating pseudorandom numbers, for example, a pre-selected seed is used with a particular algorithm to generate different numbers that appear to be random, but if an observer knows the seed and the algorithm for generating those apparently random numbers, the observer can actually algorithmically reproduce what the next number in the sequence will be. From simply looking at the pseudorandom numbers, however, it is virtually impossible to reconstruct what the next number of the sequence will be without knowledge of the seed and the algorithm. To attempt to guess the seed by trial-and-error would be infeasible.

The term 'pseudorandom' is well-known, for example, in use of spread-spectrum systems. For example, in spread-spectrum systems, modulated carrier transmissions appear as random noise to a receiver that is incapable of correlating a locally generated pseudorandom code with the received signal. However, if one knows what the particular sequence is, for example, in sending a pre-determined number of bits (i.e., ones and zeros), then it is possible to add the signals up. Even though the signals have a very small magnitude, one is able to add them up and know the sequence in which they are being sent.

As used herein, the term 'pseudorandom noise' refers to an electronic signal that appears random but is instead a deterministically generated signal that is injected into the communication channel 24 and is difficult to distinguish from the underlying signal noise. It appears to be audible noise, for example, over a telephone line because the telephone converts the electronic signal into audible sound.

By adding up the signals, for example, every second, one who knows the sequence of how to add it up according to a particular predetermined phase shift or the like can uncover the signals being sought in the particular sequence. When the particular sequence is added up, the sum of the particular bits is larger than the surrounding noise and is thus distinguishable from it. On the other hand if one does not know the sequence which is being received, one would be unable to add up the signals, which would simply appear to be random noise.

In an embodiment of the invention, the pseudorandom noise is inserted in the communication channel 24, examples which include hard wired communication, satellite communication, and microwave communication. Pseudorandom bits are modulated for transmission and sent via whatever communication channel is employed. Typically, a system receiving communication signals attempts to filter out the noise to eliminate background noise. Electronic noise sounds like audio noise, so attempts are made by the receiving system to filter it out. A system on the receiving end of the communications channel 24 will attempt to filter out that noise, which the system would interpret as noise.

Figure 3:
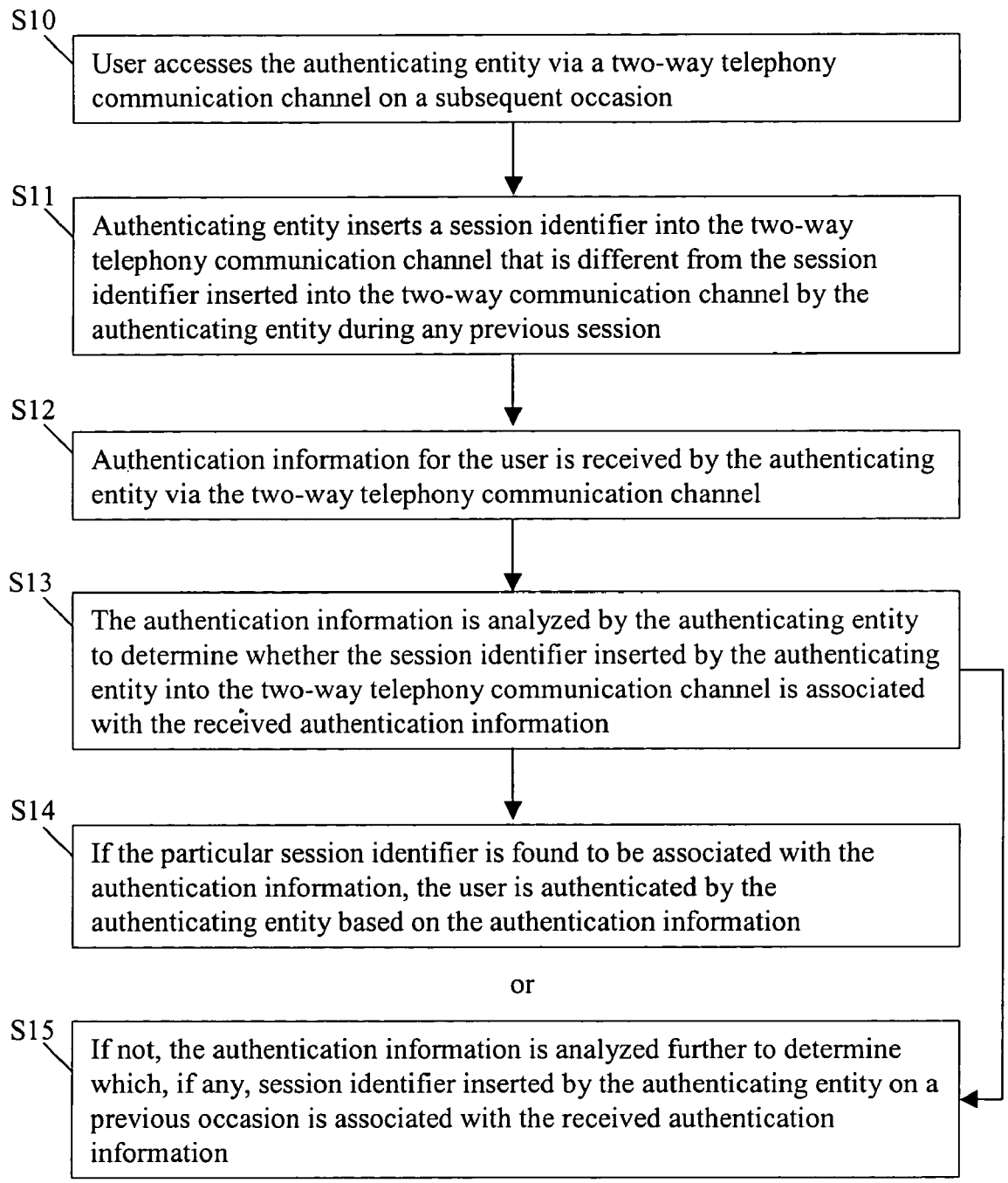
FIG. 3 is a flow chart that illustrates an example of the process of secure authentication of a user in a session conducted over a two-way telephony communication channel according to another embodiment of the present invention.

FIG. 3 is a flow chart that illustrates an example of the process of secure authentication of a user in a session conducted over a two-way telephony communication channel according to another embodiment of the present invention. Referring to FIG. 3, at S10, when the user 20 accesses the authenticating entity 26 via a two-way telephony communication channel 24, for example, on a subsequent occasion, at S11, the authenticating entity again inserts a session identifier into the two-way telephony communication channel 24, but one that is different from the session identifier inserted during any previous session. At S12, authentication information for the user 20 is likewise received by the authenticating entity 26 via the two-way telephony communication channel 24, and at S13, the authentication information is likewise analyzed by the authenticating entity 26 to determine whether the session identifier currently inserted by the authenticating entity into the two-way telephony communication channel 24 is associated with the received authentication information. At S14, if the particular session identifier is found to be associated with the authentication information, the user 20 is again authenticated by the authenticating entity 26 based on the authentication information. However, at S15, if not, the user is not authenticated, and the authentication information can be analyzed further to determine which, if any, session identifier inserted by the authenticating entity 26 on a previous occasion is associated with the received authentication information. Thus, the authenticating entity 26 can determine which, if any, previous session was recorded and played back.

In an embodiment of the invention, a particular timed sample of a pre-defined sequence of pseudorandom noise is added up linearly to provide a much stronger signal, and if it matches the known pre-determined signal with phase shifts, and the like, it is known that the signal is a recorded replay. If a succeeding sequence adds up, for example, with phase shifts in a particular manner in the way in which it is expected, it is recognized as a particular sample of random noise injected into the communications channel 24.

Assume, for example, that there are 1000 bits in a sequence of pseudorandom noise and that the amplitude of the pseudorandom noise is 1000ths of the amplitude of the signal transmitted via the communication channel 24. Therefore, the amplitude of each instance of these bits is 1000ths of the amplitude of the signal and appears to be random noise in the receiving system. However, if one knows how to add up the bits and knows the sequence of the bits in the pseudorandom noise and how they were generated, for example, by frequency or amplitude modulation or the like, one can add up the bits in the correct manner. Then, the signal is 1000 times greater in magnitude than each individual bit because they have been added 1000 times. Thus, a strong signal of pseudorandom noise is seen in the system, because the bits have been added up in the particular sequence in which they are expected to appear in a particular secret pattern. This is the way in which signals are sent, for example, in spread-spectrum systems that enables multiple communications over the same physical channel without interfering with one another.

In an aspect of the invention, for example, a special training signal is sent with pseudorandom noise inserted which is below the level of the actual random noise in the communication channel 24. In another aspect, each time there is a communication via the communication channel 24, a different pseudorandom signal is inserted. Thus, each time a pseudorandom noise is sent with a communication via the communication channel 24, a different pseudorandom noise signal is inserted in the communication. If indeed what comes back to the authenticating entity 26 in the authentication information is the same pseudorandom noise signal that was inserted in a previous communication, it would be known that the communication is a recording.

When the communication channel 24 is opened to the user 20, the pseudorandom noise signal is inserted that passes through any receiving system undetected because it appears to be below the typical signal to noise ratio. When the communication signal comes back to the authenticating entity 26, such as a financial institution, the pseudorandom noise signal is pulled from the communication signal because the predetermined sequence of the pseudorandom noise is known to the authenticating entity 26. The authenticating entity 26 can store, for example, the last n authentication communications, so if any one of the last n authentication communications were recorded and played back, it would be known to the authenticating entity 26 from the sequence that the current communication is a playback of one of the n previous communications.

While it is possible for a recording of a user's enrollment process to be made illicitly, such an occurrence is probably unlikely. However, it is more likely that such a recording could be made after enrollment when the user 20 routinely authenticates or verifies himself or herself by his or her voice print by speaking a phrase on which the authenticating entity's system is trained. Thus, an unauthorized person can tap into a landline communication channel 26 between the user 20 and the authenticating entity 26, such as the financial institution, or if the communication channel 24 is wireless, simply intercept the signal with a receiver, and record the user 20 speaking his or her authentication or verification phrase. The unauthorized person can simply dial in to the authenticating entity 26 at a later time and pretend he or she is the user 20, and when asked to speak the authentication or verification phrase, the unauthorized person can simply play the recording.

In an embodiment of the invention, present techniques of detecting such a recording include, for example, essentially looking for some unique characteristics of the recording device, which is increasingly difficult because current technology enables recording devices with ever higher levels of fidelity to the original sound. An embodiment of the present invention is not dependent on matching the original sound pattern. Instead, each time the authenticating entity 26 sends its request to the user 20 to speak his or her authentication or verification, the communication is sent with pseudorandom noise sequences, modulations, phase shifts, or the like. For each time slot in which the modulations are done, the amplitude is very small, so it does not disturb the user 20 to hear it, and the sensitivity of the receiving system or a recording device will not filter it out. When the user 20 speaks the authentication or verification and it is sent back to the authenticating entity 26, the sequences are added up lineally in the correct phase, so that the pseudorandom noise signal is recovered in addition to the user's verification phrase.

In other words, the verification phrase plus the pseudorandom noise signal is received by the authenticating entity 26 from the user 20. The authenticating entity 26 knows what the pseudorandom noise signal was when the user 20 was verified on preceding occasions. The next time the user 20 calls in to be authenticated or verified, the authenticating entity 26 inserts a different pseudorandom noise sequence into the system. So, if the authenticating entity 26 pulls out of the user's current verification phrase and determines that it is not associated with the pseudorandom noise sequence that was currently sent to the user 20, but is instead associated with a pseudorandom noise sequence for a preceding session, it is readily apparent to the authenticating entity 26 that the current verification is a recorded playback.

The number of preceding verifications that are stored by the authenticating entity 26 for comparison varies, depending how far back the authenticating entity 26 wants to compare. If, for example, ten preceding verifications are retained in storage, each with its own unique pseudorandom noise sequence inserted, the current verification can then be compared not only with the current pseudorandom noise sequence, but also with any or all of the ten preceding verifications. Each pseudorandom noise signal is added up lineally in the correct fashion to see if the result is a pseudorandom noise signal from one of those preceding ten verifications, and if so, the authenticating entity 26 knows that the current verification is a recording, and moreover, the authenticating entity 26 knows precisely which preceding verification was recorded.

Various preferred embodiments of the invention have been described in fulfillment of the various objects of the invention. It should be recognized that these embodiments are merely illustrative of the principles of the present invention. Numerous modifications and adaptations thereof will be readily apparent to those skilled in the art without departing from the spirit and scope of the present invention.

What is claimed is:

1. A method for secure authentication of a user in a session conducted over a two-way telephony communication channel, comprising:

allowing the user to access an authenticating entity via a two-way telephony communication channel;

inserting a session identifier by the authenticating entity into the two-way telephony communication channel that is infeasible to detect or eliminate without knowledge of a secret known to the authenticating entity, wherein inserting the session identifier into the communication channel further comprises inserting pseudorandom noise deterministically generated according to the secret known only to the authenticating entity into the communication channel by the authenticating entity;

receiving authentication information for the user by the authenticating entity via the two-way telephony communication channel;

analyzing the authentication information by the authenticating entity to determine whether the session identifier inserted by the authenticating entity into the two-way telephony communication channel is associated with the received authentication information; and authenticating the user by the authenticating entity based on the authentication information if the session identifier is found to be associated with the authentication information.

2. The method of claim 1, wherein the user further comprises one of a voice user and a touch tone keypad user.

3. The method of claim 1, wherein the authenticating entity further comprises a financial institution.

4. The method of claim 1, wherein the two-way telephony communication channel further comprises one of a two-way land line telephony communication channel, a two-way wireless telephony communication channel and a two-way voice over Internet protocol (VoIP) telephony communication channel.

5. The method of claim 1, wherein the two-way telephony communication channel further comprises one of a two-way hard-wired telephony communication channel, a two-way satellite telephony communication channel, and a two-way microwave telephony communication channel.

6. The method of claim 1, wherein the secret known only to the authenticating entity further comprises a pre-determined seed in combination with a pre-selected algorithm for generating the pseudorandom noise.

7. The method of claim 6, wherein analyzing the pseudorandom noise further comprises analyzing the pseudorandom noise associated with the authentication information using the pre-determined seed in combination with the pre-selected algorithm.

8. The method of claim 6, wherein inserting the session identifier into the two-way telephony communication channel further comprises injecting a session identifier modulated by the pseudorandom noise into the communication channel by the authenticating entity.

9. The method of claim 1, wherein inserting the session identifier into the communication channel further comprises inserting the session identifier into the two-way telephony communication channel by the authenticating entity during an initial personal identification number (PIN) training session for the user.

10. The method of claim 1, wherein inserting the session identifier into the communication channel further comprises inserting a different session identifier into the communication channel by the authenticating entity during each session in which authentication information consisting at least in part of a personal identification number (PIN) is entered for the user.

11. The method of claim 1, wherein receiving the authentication information further comprises receiving authentication information for the user that is entered at least in part by speaking the authentication information.

12. The method of claim 1, wherein receiving the authentication information further comprises receiving authentication information for the user that is entered at least in part on a touch tone keypad.

13. The method of claim 1, wherein the authentication information consists at least in part of a personal identification number (PIN) for the user that is entered by one of speaking the PIN and a touch tone keypad.

14. The method of claim 1, wherein analyzing the authentication information further comprises analyzing pseudorandom noise associated with the authentication information by the authenticating entity to determine whether it is the same as the pseudorandom noise inserted by the authenticating entity into the communication channel.

15. The method of claim 1, wherein analyzing the authentication information further comprises identifying a playback of a recording of a session identifier inserted by the authenticating entity into the two-way telephony communication channel on a preceding occasion.

16. A system for secure authentication of a user in a session conducted over a two-way telephony communication channel, comprising:
means for allowing the user to access an authenticating entity via a two-way telephony communication channel;
means for inserting a session identifier by the authenticating entity into the two-way telephony communication channel that is infeasible to detect or eliminate without knowledge of a secret known to the authenticating entity, wherein the means for inserting the session identifier into the communication channel further comprises a pseudorandom noise generator adapted for inserting a pseudorandom noise deterministically generated according to the secret known only to the authenticating entity into the communication channel by the authenticating entity;
means for receiving authentication information for the user by the authenticating entity via the two-way telephony communication channel;
means for analyzing the authentication information by the authenticating entity to determine whether the session identifier inserted by the authenticating entity into the two-way telephony communication channel is associated with the received authentication information; and
means for authenticating the user by the authenticating entity based on the authentication information if the session identifier is found to be associated with the authentication information.

17. The system of claim 16, wherein the user further comprises one of a voice user and a touch tone keypad user.

18. The system of claim 16, wherein the authenticating entity further comprises a financial institution.

19. The system of claim 16, wherein the two-way telephony communication channel further comprises one of a two-way land line telephony communication channel, a two-way wireless telephony communication channel and a two-way voice over Internet protocol (VoIP) telephony communication channel.

20. The system of claim 16, wherein the two-way telephony communication channel further comprises one of a two-way hard-wired communication channel, a two-way satellite communication channel, and a two-way microwave communication channel.

21. The system of claim 16, wherein the secret known only to the authenticating entity further comprises a pre-determined seed in combination with a pre-selected algorithm for generating the pseudorandom number.

22. The system of claim 21, wherein the means for inserting the session identifier into the two-way telephony communication channel further comprises a pseudorandom noise generator adapted for injecting a session identifier modulated by the pseudorandom noise into the communication channel.

23. The system of claim 21, wherein the means for analyzing the pseudorandom noise further comprises means for analyzing the pseudorandom noise associated with the authentication information using the pre-determined seed in combination with the pre-selected algorithm.

24. The system of claim 16, wherein the means for inserting the session identifier into the communication channel further comprises means for inserting the session identifier into the two-way telephony communication channel by the authenticating entity during an initial personal identification number (PIN) training session for the user.

25. The system of claim 16, wherein the means for inserting the session identifier into the communication channel further comprises means for inserting a different session identifier into the communication channel by the authenticating entity during each session in which a PIN is entered for the user.

26. The system of claim 16, wherein the means for receiving the authentication information further comprises means for receiving authentication information for the user that is entered at least in part by speaking the authentication information.

27. The system of claim 16, wherein the means for receiving the authentication information further comprises means for receiving authentication information for the user that is entered at least in part on a touch tone keypad.

28. The system of claim 16, wherein the means for receiving the authentication information consists at least in part of a personal identification number (PIN) for the user that is entered by one of speaking the PIN and a touch tone keypad.

29. The system of claim 16, wherein the means for analyzing the authentication information further comprises means for analyzing pseudorandom noise associated with the authentication information by the authenticating entity to determine whether it is the same as the pseudorandom noise inserted by the authenticating entity into the communication channel.

30. The system of claim 16, wherein the means for analyzing the authentication information further comprises means for identifying a playback of a recording of a session identifier inserted by the authenticating entity into the two-way telephony communication channel on a preceding occasion.

* * * * *